June 3, 1924.
W. C. BRINTON
SIPHON
Filed Dec. 31, 1921
1,496,366
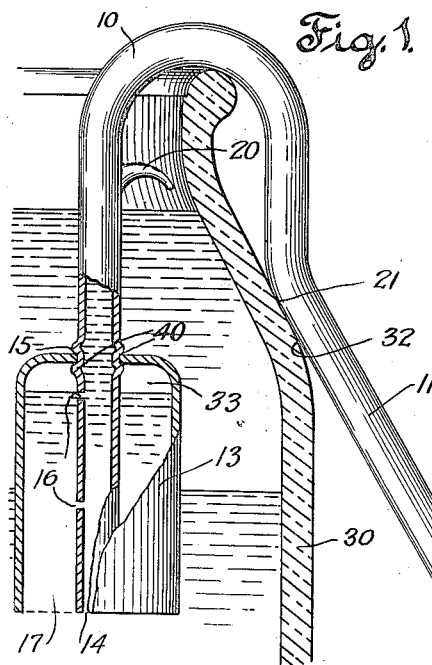
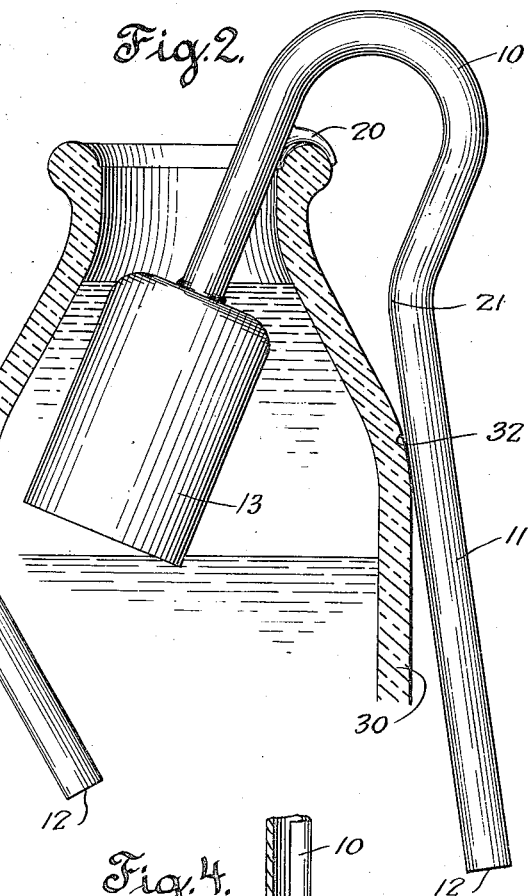
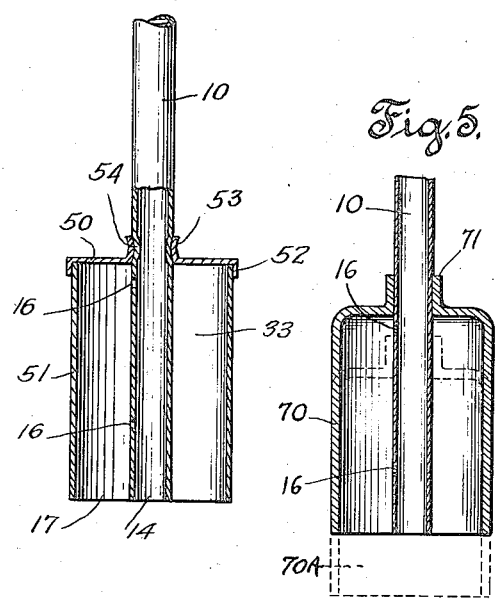
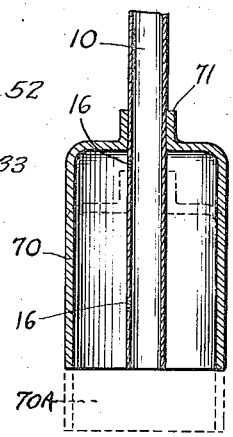
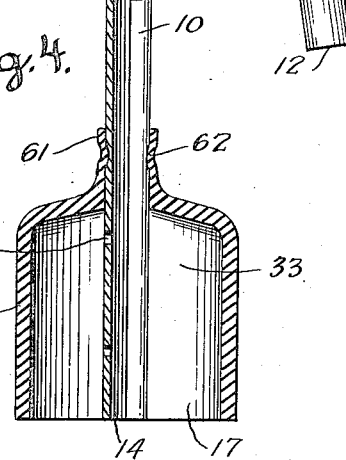
INVENTOR
Willard C. Brinton
BY E. W. Marshall
ATTORNEY Patented June 3, 1924.

1,496,366

UNITED STATES PATENT OFFICE.

WILLARD C. BRINTON, OF NEW YORK, N. Y.

SIPHON.

Application filed December 31, 1921. Serial No. 526,286.

*To all whom it may concern:*

Be it known that I, WILLARD C. BRINTON, a citizen of the United States, and a resident of New York, county and State of New York, have invented certain new and useful Improvements in Siphons, of which the following is a specification.

This invention relates to improvements in siphons, and has for its main object the provision of improved means for drawing off a liquid from one level to a relatively different level.

Another object relates to the combination of a siphon with gauging means for measuring a predetermined quantity of liquid to be drawn off.

Another object relates to the provision of an improved form of cream separator, particularly adapted for household use, whereby dairy products as usually delivered in containers of conventional type, may readily be separated in the milk and cream components.

Another object relates to the provision of improved automatic means for initiating flow through a siphon.

Still another object relates to the provision of means for producing increased pressure of a compressible fluid, whereby the liquid to be drawn off may flow at an increased rate.

Another object relates to the provision of improved means for regulating or limiting the rate of flow.

Another object relates to an improved form of construction, whereby the structure may be cheaply and economically manufactured in large quantities.

Another object relates to varying the quantity of liquid to be drawn off, by varying the depth of immersion of the intake end of the siphon.

Other objects will appear from the following description taken in connection with the accompanying drawings, in which—

Figure 1 is a sectional elevation of one form of siphon embodying features of the invention, as in use to take the cream off a bottle of milk.

Figure 2 shows the siphon of Figure 1 applied in a different manner to take off less cream.

Figure 3 shows a modified form of siphon.

Figures 4 and 5 show further modifications of the invention.

Like characters of reference denote like parts in the several figures of the drawings.

Referring to the drawings and more particularly to Figure 1, there is shown one embodiment of the invention comprising a bent tube 10 formed of metal or other suitable material and having its upper portion in U-shaped form, and an outer angular extension 11 terminating in a discharge outlet 12. The opposite end of the tube 10 extends into a concentric shell 13 and terminates in an intake opening 14. The shell 13 may be secured to the tube 10 at the point 15 in any appropriate manner and this connection is preferably made liquid and air tight to prevent undesired escape of fluid. At a point within the shell 13 and near the upper extremity thereof a wall of the tube 10 is apertured forming an orifice 16 for a purpose that will be specifically set forth. The lower end of the shell 13 is shown as entirely open to provide an inlet 17, which enables full pressure to be applied to air trapped within the shell.

For supporting the siphon in position upon a container or receptacle there is provided a hook member 20 affixed to a side of the tube 10 on the concave part of the U-shaped portion. It will be noted in Figure 1 that the shoulder or bend 21 at the junction of the discharge arm with the end of the U-shaped portion may also be employed for supporting the siphon in position.

In the operation of the structure as shown in Figure 1 the siphon is supported by simply being hung over the edge of the container holding liquid which is to be withdrawn. For the purpose of illustrating one application of the invention there is shown an ordinary milk bottle 30 such as is employed for delivering milk to households. It will be noted that the shoulder 21 cooperates with the side of the milk bottle at 32 to maintain the siphon in substantially vertical position. Immersion of the shell 13 into the liquid within the bottle compresses the air contained within the space 33 between the wall of the shell 13 and the wall of the tube 10. The size of the orifice 16 is such that this air can only escape at a rate less rapid than the rate at which it is compressed by usual immersion. Escape of the air through the orifice 16 into the interior passage of the tube 10 causes bubbles to rise in that portion of the tube 10 above the level of the orifice 16 and these bubbles create a current of liquid upwardly. This in turn causes a partial vacuum in that portion of the tube 10 below the level of the orifice 16 and the consequent suction draws upwardly the liquid through the intake opening 14.

Upward movement of the liquid continues until the liquid passes over the upper bend of the siphon and out through the extension 11 and as soon as the action has been initiated as described, the siphon continues to pass the liquid in a manner similar to that of an ordinary siphon. The action continues until the level of the liquid in the bottle 30 recedes to the level of the intake opening 14 (Figure 1) or until the edge of the bell is uncovered (Figure 2).

It will be seen that the quantity of liquid withdrawn from the bottle 30 is controlled by the extent to which the tube 10 extends into the bottle, which in turn may be determined by the distance from the surface 21 to the opening 14. This distance is preferably made such that when the siphon is fully immersed in the manner described into a bottle of high grade milk such as that known as grade A, the amount of cream usually present in the top of such a bottle will be withdrawn.

For withdrawing the amount of cream usually present in milk bottles of other grades, such as, for example, that known as grade B milk, the hook 20 may be supported upon the upper edge of the bottle 30 as in Figure 2. In this case the level of the inlet opening 14 is different from the case previously described and a lesser quantity is withdrawn. The setting of the hook 20 is preferably made such that the quantity of cream usually present in the upper portion of a bottle of grade B milk will be withdrawn when the hook 20 is used as described.

In the form of the invention thus far shown the shell 13 is attached to the tube 10 by crimping the tube 10 against the outer and inner surfaces at the top of the bell as shown at 40.

In the embodiment of the invention shown in Figure 3 the tube 10 is inserted through a centrally positioned orifice in a cup shaped washer 50, the shell 51 corresponding to the shell 13 previously described, but formed simply of a section of a standard tube of suitable length secured to the washer 50. The diameter of the shell 51 is such as to make a tight joint with the washer 50, and this joint may be improved by turning down the edge of the washer to form an annular flange 52 engaged over the edge of the shell. The washer also may have an inner flange 53, spun or crimped into a groove in the tube at 54.

In the modified form of the invention shown in Figure 4, the shell 60 has a reduced or thinned annular neck 61 which is rolled or spun into a groove in the tube, as indicated at 62. A special advantage resulting from leaving the bottom of the shell or bell entirely open, is that upon immersion of the same, pressure is applied to the entrapped air over the full cross-sectional area of the bell, thus increasing the pressure and causing the siphonic action to start the sooner. The full air pressure is thus made immediately available. To take full advantage of this increased pressure, I may have more than one outlet 16, and arranged at different levels, as shown, to provide several trains of flow initiating bubbles, supplementing and assisting each other.

If desired, the bell may be adjustably or detachably engaged upon the siphon tube as shown in Figure 5. In this view the bell is designated 70 and is shown as having a slip connection on the tube at 71, permitting of its removal and also its adjustment on the tube. These features are advantageous for cleaning purposes and also where a close adjustment of the top of the bell with respect to the opening 16 is desired. The dotted lines at 70ᴬ illustrate how the mouth of the bell may be lowered below the inlet to the siphon and also how the bell may be entirely slipped off the end of the siphon. If desired, the bell might be made with a taper fit on the tube so as to overcome any possibility of leakage at the point of connection therewith.

The two-point engagement of the siphon with the mouth and outside surface of the bottle or container, as illustrated in Figures 1 and 2, prevent the siphon from tilting or rocking on the neck of the container. This feature will be particularly appreciated when it is realized that when first dipped in the liquid, the immersed end of the siphon is relatively light, due to the entrapped air and that as the air escapes up the siphon tube, this end becomes lighter and hence might impart a rocking movement to the siphon if it were not for the fact that the tube is supported and steadied as described.

As the bell is opened at its lower end and is in communication with the interior of the siphon tube, it will be apparent that the siphonic action will cease when the bell is uncovered by the receding liquid, hence the position of the bell actually determines the point at which the siphon will cease to function. This added feature of the siphon is particularly noticeable when the siphon is tilted as in Figure 2.

Illustrative apparatus has been shown for the purpose of showing ways in which the invention may be practised but it is expressly understood that the scope of the invention is not to be limited thereby, reference being had to the appended claims for that purpose.

What I claim is:

1. A siphon having means for automatically initiating passage of liquid therethrough and a plurality of selective means for supporting the same with said automatic flow initiating means positioned at different levels.

2. A siphon tube having an air trapping bell surrounding the inlet end thereof and in communication with the interior of the tube by a restricted opening, said bell being open at its lower end to freely admit a substantially unrestricted body of liquid for forcefully expelling air trapped within the bell through the restricted opening into the tube.

3. A siphon having means for automatically initiating siphonic flow of liquid therethrough and provided with a plurality of selective means for selectively determining the quantity to be withdrawn.

4. A siphon having means for automatically initiating siphonic passage of liquid therethrough and provided with a plurality of selective means for supporting the siphon upon a container in a selected one of a plurality of positions, whereby the quantity of liquid to be withdrawn may be predetermined.

5. The structure of claim 2 wherein the bell is of substantially cylindrical form, directly attached to and carried by the inlet portion of the siphon tube and wholly open at its lower end the full internal diameter of the cylindrical bell to give free access for cleaning the interior of the bell.

6. A siphon for conducting liquid having means for initiating passage of liquid therethrough and including an open ended casing for compressing a gaseous medium when the siphon is immersed in a liquid, said siphon having apertures at different levels within the casing.

7. A siphon having an open ended bell on the inlet end thereof for trapping and compressing a quantity of air as said inlet end is submerged in a body of liquid, said bell being in communication with the siphon tube by a plurality of relatively small openings for enabling the air as it is compressed to escape into the tube in the form of a number of streams of bubbles for initiating siphonic flow.

8. A siphon tube having an aperture therein near the inlet end thereof and a cylindrical bell having its lower end open and unobstructed and having its upper end detachably engaged on the tube above said aperture.

9. A siphon tube having an aperture therein near the inlet end thereof and a cylindrical bell having its lower end open and unobstructed and having its upper end adjustably secured to the tube above said aperture.

10. A siphon tube having an air trapping bell slidably mounted on the inlet end thereof whereby the bell may be adjusted thereon and in communication with the interior of the tube by a restricted opening, said bell being open at its lower end to freely admit a substantially unrestricted body of liquid for forcefully expelling air trapped within the bell through the restricted opening into the tube.

11. A siphon tube having an air trapping bell surrounding the inlet end thereof and in communication with the interior of the tube by a restricted opening, said bell being open at its lower end to freely admit a substantially unrestricted body of liquid for forcefully expelling air trapped within the bell through the restricted opening into the tube, and means carried by and forming part of the siphon for supporting the siphon on a vessel from which liquid is being withdrawn at different levels to thereby position the open end of the bell at different depths in the liquid.

12. A siphon having means for automatically initiating passage of liquid therethrough and a plurality of selective rigid means for supporting the same with said automatic flow initiating means positioned at different levels.

In witness whereof, I have hereunto set my hand this 29th day of December, 1921.

WILLARD C. BRINTON.